April 7, 1942.  W. C. SPEAR  2,279,210
SELF-STARTING SINGLE-PHASE INDUCTION-MOTOR WITH
PLUGGING REVERSING CONNECTIONS
Filed Jan. 10, 1940
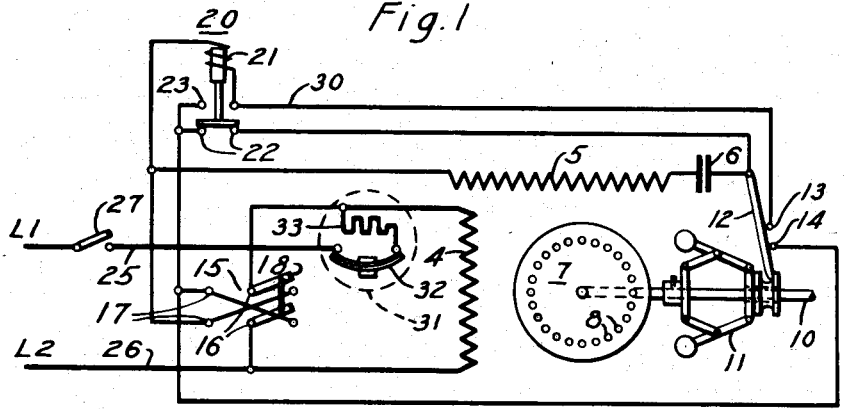
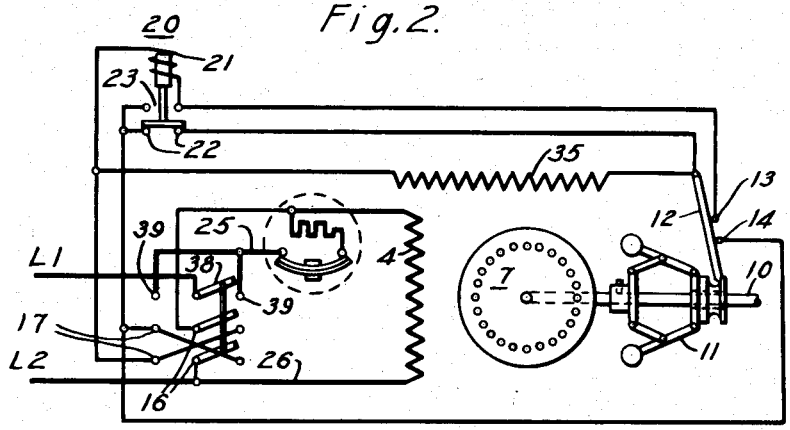
WITNESSES:
INVENTOR
Wendell C. Spear.
BY
ATTORNEY Patented Apr. 7, 1942

2,279,210

UNITED STATES PATENT OFFICE 2,279,210

SELF-STARTING SINGLE-PHASE INDUCTION MOTOR WITH PLUGGING REVERSING CONNECTIONS

Wendell C. Spear, Wapakoneta, Ohio, assignor to Westinghouse Electric & Manufacturing Company, East Pittsburgh, Pa., a corporation of Pennsylvania Application January 10, 1940, Serial No. 313,244

8 Claims. (Cl. 172—279)

My invention relates to single-phase self-starting induction-motors for use on applications such as cranes, hoists, door-openers, lathes, and on numerous other applications requiring plug-reversing motors, or motors which may be very quickly reversed by reversing the starting-winding connections relative to the main-winding connections. My invention particularly relates to either split-phase or capacitor-type motors which are provided with a start-run switch for disconnecting the split-phase or capacitor-type starting-winding when the motor reaches a predetermined percentage of its normal running-speed.

The principal object of my invention is to provide improved and simplified circuit-controlling means for effecting the plugging reversal of such motors.

More specifically, my invention relates to a plug-reversing control-means utilizing a line-voltage-responsive auxiliary relay which can be simply designed in accordance with the line-voltage, without requiring a separate, specially designed relay for each current-rating of a series of motors of a similar type.

With the foregoing and other objects in view, my invention consists in the system, methods, combinations, circuits and apparatus hereinafter described and claimed and illustrated in the accompanying drawing wherein:

Figs. 1 and 2 are diagrammatic views of circuits and apparatus illustrating my invention in two different forms of embodiment thereof.

As shown in the drawing, Fig. 1, my invention is utilized in connection with a self-starting single-phase capacitor-type induction-motor having a primary member which is wound with a main-winding 4 and a substantially quadrature-related starting-winding 5. The starting-winding 5 is connected in series-circuit relation to a capacitor 6 which causes the current in the starting winding-means 5—5 to be out of phase with the current in the main-winding 4 when both windings are energized in parallel across the same single-phase line L1—L2. The motor is also provided with a secondary member which is shown as the rotor-member 7, provided with squirrel-cage windings 8, or other equivalent poly-axially short-circuited secondary winding-means. The rotor member 7 is mounted on a shaft 10 which is illustrated as carrying a speed-responsive device or centrifugal governor 11 which actuates a start-run switch 12 having two back-contacts 13 and 14.

To reverse the motor, a double-pole double-throw reversing-switch 15 is provided, having input-terminals 16 and output-terminals 17, which may be connected together, in either order of connection, or which may be disconnected from each other, by means of double-throw switch-blades 18.

In accordance with my invention, I also provide a line-voltage-responsive relay 20 having an actuating coil 21, back-contacts 22 and front or make-contacts 23.

The motor-terminals 25 and 26 are connected to the supply-line L1—L2 through a line-switch 27. The motor-terminals 25 and 26 are connected to the terminals of the main-winding 4 and also to the input-terminals 16 of the reversing-switch 15. The output-terminals 17 of the reversing switch are utilized to energize the starting-winding 5 through the capacitor 6, the centrifugal switch 12 and the back-contact 14 of the centrifugal switching device, when the latter is in its starting position, as illustrated. The operating coil 21 of the relay 20 is initially energized, with the line-voltage, from the output terminals 17 of the reversing-switch 15, through a circuit which includes a conductor 30, and the back-contacts 13 and 14 which are shunted by the centrifugal switch-arm 12 in the starting position of the latter. When the relay 20 once picks up, a holding-circuit is established through the make-contacts 23 of the relay, which connects the operating coil 21 across the output-terminals 17 of the reversing-switch 15, so that the relay remains energized as long as it receives at least a certain critical voltage, which may be of the order of 50% of the supply-voltage of the line L1—L2. A second energizing circuit for the starting winding-means 5—5 is provided by the relay back-contacts 22 which by-pass the centrifugal switch-circuit 12—14, so that the relay 20 will cause the starting winding-means 5—5 to be energized, across the output-terminals 17 of the reversing-switch 15, and hence across the motor-terminals 25 and 26, whenever the relay 20 is in its deenergized or non-actuated position, regardless of the position of the centrifugally-actuated start-run switch 12.

In operation, the reversing-switch 15 of Fig. 1 is initially closed, in one position or the other, in preparation for energizing the motor in a desired direction of rotation. The motor is energized by the closure of the line-switch 27 which causes the main-winding 4 and the starting winding-means 5—5 to be energized, in parallel with each other, across the line L1—L2, in the manner previously described. The motor then rapidly starts, and at a certain predetermined speed in its starting cycle, the centrifugally-actuated start-run switch 12 suddenly snaps open, breaking the back-contacts 13 and 14. The opening of the back-contact 14 disconnects the starting winding-means 5—6 from the line, so that the motor thereafter operates only on its main or running winding 4. The opening of the back-contact 13 breaks the initial energizing-circuit through the relay-coil 21, but the relay has meanwhile picked up and established its own holding-circuit at its front-contacts 23, so that the relay 20 remains in its actuated position during the entire normal running-operation of the motor.

When it is desired to reverse the motor, all that is required is to reverse the double-throw reversing-switch 15. The initial movement of the reversing-switch blades 18 deenergizes the output-terminals 17 of the reversing-switch, thus deenergizing the relay 20 so that the latter drops out, and returns to its deenergized position, closing its back-contacts 22. When the reversing-switch blades 18 are moved all the way over to the closed position in the reversed order of energization of the output terminals 17 of the reversing-switch 15, a circuit will be immediately established, through the relay back-contacts 22, to the starting winding-means 5—6, even though the centrifugal switch 12 is in its running-position with the switch-blade 12 out of contact with its back-contact 14. This energization of the starting winding-means 5—6 causes said winding-means to be energized from the line L1—L2 in a polarity which is reversed with respect to its initial starting-polarity, so that the motor is now energized in such manner as to develop a strong torque tending to cause the motor to operate in a reversed direction.

The motor is now rapidly decelerating, under the influence of the reversing torque, and when its speed falls off a sufficient amount, the centrifugal start-run switch 12 will return to its starting position, establishing a second energizing circuit, at the back-contact 14, for the starting winding-means 5—6. At the same time, the start-run switch 12 closes its back-contact 13, which energizes the relay-coil 21 across the line, and produces an actuation or picking-up of the relay. It will be noted, however, that the relay 20 has remained in its non-actuated position long enough to cause the motor to decelerate to the speed at which the centrifugal switch 12 returns to its starting position, at which time the centrifugal-switch contact 14 continues to energize the starting winding-means 5—6, even after the relay 20 has opened its back-contacts 22. The motor thereupon continues to decelerate to standstill, and immediately begins to accelerate again in the reverse direction, with both of the primary windings 4 and 5 energized, until, at a predetermined critical speed in the reverse direction, the centrifugal switch 11—12 again operates and deenergizes the starting-winding 5, leaving the auxiliary relay 20 energized through its holding-contact 23, as previously described.

In connection with my invention, I have also shown a thermal switch 31 comprising a bimetallic contact-element 32 and a juxtaposed heating-resistor 33. The bimetallic switch-contact element 32 is mounted in juxtaposition to the motor, preferably on the stator frame, so that it is in direct heat-reducing relation to the motor, and it is also heated by its own individual heater 33 which is connected in series with the bimetallic contact-element 32. In the arrangement shown, the thermal element 31 is connected in series with one of the line-leads L1 and the motor terminal 25. The thermal element 31 serves as a thermal protective device for protecting the motor against overheating from any cause, such as overloading or failure to start when the motor is energized.

It will be understood that the starting winding-circuit 5—6 may be any spatially dephased winding, carrying currents out of phase with the main primary winding 4, and it will also be understood that various equivalent connecting and switching means may be utilized.

Thus, in Fig. 2, I show my invention applied to a split-phase motor in which, instead of utilizing the capacitor-winding 5—6, I utilize a split-phase winding 35, which inherently has such a ratio of resistance to inductance that the current therein is out of phase with the current in the main winding 4. In this Fig. 2, I also show the main line-switch as being incorporated in the double-throw reversing-switch 38, which has three poles instead of two, as in Fig. 1. The third pole 39 serves the function of the line-switch 27 of Fig. 1, so that the single triple-pole double-throw switch 38 serves to control the starting, stopping and reversing of the motor.

While I have shown my invention in two forms of embodiment, which are now preferred by me, I desire it to be understood that my invention is not limited to these precise forms of embodiment, as various changes may be made, by way of additions, substitutions and omissions, without departing from the broader features of my invention. I desire, therefore, that the appended claims shall be accorded the broadest construction consistent with their language and the prior art.

I claim as my invention:

1. In combination, a self-starting single-phase induction-motor having relatively rotating primary and secondary members, the primary member having a main winding-means and a substantially quadrature-related starting winding-means of a type adapted to have current out of phase with the current in the main winding-means, means for establishing starting connections whereby both the main and the starting winding-means are energized from a single single-phase supply-line, start-run switching means, operable after the motor has started, for changing the connections of the aforesaid starting winding-means from a starting condition to a running condition, and for also changing an auxiliary relaying circuit, reversing-means for reversing the connections of one of said primary-member winding-means relatively to the other primary-member winding-means, a line-voltage-responsive relay operable, whenever it is in its non-actuated position, to substantially establish the starting connections of the aforesaid starting winding-means even when the start-run switching-means is in its running condition, means for initially energizing said relay through said reversing-means and through the auxiliary relaying circuit of said start-run switching-means when the latter is in its starting condition, and separate circuit-means, responsive to the actuated position of said relay, for subsequently maintaining the energization of said relay from the line-voltage as long as at least a predetermined voltage is applied thereto, said relay being operative to return quickly to its non-actuated position when it fails to receive said predetermined voltage, said reversing-means being operative to momentarily cause said relay to fail to receive said predetermined voltage while said reversing-means is being actuated, and said start-run switching-means being operative, in its running condition, to make it impossible for said auxiliary relaying circuit to supply said relay with said predetermined voltage.

2. In combination, a self-starting single-phase induction-motor having relatively rotating primary and secondary members, the primary member having a main winding-means and a substantially quadrature-related starting winding-means of a type adapted to have current out of phase with the current in the main winding-means, means for establishing starting connections whereby both the main and the starting winding-means are energized from a single single-phase supply-line, start-run switching-means operable after the motor has started, for changing the connections of the aforesaid starting winding-means from a starting condition to a running condition, and for also changing an auxiliary relaying circuit, a three-position reversing-switch having input-terminals, output-terminals and operating switch-contact means having a first position in which the output-terminals are connected to the input-terminals in a first order of connection, a second position in which the electrical connection between the input and output terminals is broken, and a third position in which the output-terminals are connected to the input-terminals in a reversed order of connection, the input-terminals of the reversing-switch being energized from the single-phase supply line, the aforesaid starting winding-means being energized from the output-terminals of the reversing-switch, a line-voltage-responsive relay operable, whenever it is in its non-actuated position, to substantially establish the starting connections of the aforesaid starting winding-means even when the start-run switching-means is in its running condition, means for initially energizing said relay from the output-terminals of the reversing-switch through the auxiliary relaying circuit of said start-run switching-means when the latter is in its starting condition, and separate circuit-means, responsive to the actuated position of said relay, for subsequently maintaining the energization of said relay from the output-terminals of the reversing-switch as long as at least a predetermined voltage is applied thereto, said relay returning to its non-actuated position whenever said reversing switch is actuated from its first position to its third position, or vice versa, and said start-run switching-means being operative, in its running condition, to make it impossible for said auxiliary relaying circuit to supply said relay with said predetermined voltage.

3. In combination, a self-starting single-phase induction-motor having relatively rotating primary and secondary members, the primary member having a main winding-means and a starting winding-means including a motor-winding in substantially quadrature-relation to the main winding-means and a serially connected capacitor for producing a starting-winding current which is always out of phase with the current in the main winding-means, means for establishing starting connections whereby both the main and the starting winding-means are energized from a single single-phase supply-line, start-run switching-means, operable after the motor has started, for changing the connections of the aforesaid starting winding-means from a starting condition to a running condition, and for also changing an auxiliary relaying circuit, reversing-means for reversing the connections of one of said primary-member winding-means relatively to the other primary-member winding-means, a line-voltage-responsive relay operable, whenever it is in its non-actuated position, to substantially establish the starting connections of the aforesaid starting winding-means even when the start-run switching-means is in its running condition, means for initially energizing said relay through said reversing-means and through the auxiliary relaying circuit of said start-run switching-means when the latter is in its starting condition, and separate circuit-means, responsive to the actuated position of said relay, for subsequently maintaining the energization of said relay from the line-voltage as long as at least a predetermined voltage is applied thereto, said relay being operative to return quickly to its non-actuated position when it fails to receive said predetermined voltage, said reversing-means being operative to momentarily cause said relay to fail to receive said predetermined voltage while said reversing-means is being actuated, and said start-run switching-means being operative, in its running condition, to make it impossible for said auxiliary relaying circuit to supply said relay with said predetermined voltage.

4. In combination, a self-starting single-phase induction-motor having relatively rotating primary and secondary members, the primary member having a main winding-means and a starting winding-means including a motor-winding in substantially quadrature-relation to the main winding-means and a serially connected capacitor for producing a starting-winding current which is always out of phase with the current in the main winding-means, means for establishing starting connections whereby both the main and the starting winding-means are energized from a single single-phase supply line, start-run switching-means, operable after the motor has started, for changing the connections of the aforesaid starting winding-means from a starting condition to a running condition, and for also changing an auxiliary relaying circuit, a three-position reversing-switch having input-terminals, output-terminals and operating switch-contact means having a first position in which the output-terminals are connected to the input-terminals in a first order of connection, a second position in which the electrical connection between the input and output terminals is broken, and a third position in which the output terminals are connected to the input-terminals in a reversed order of connection, the input-terminals of the reversing-switch being energized from the single-phase supply line, the aforesaid starting winding-means being energized from the output-terminals of the reversing-switch, a line-voltage-responsive relay operable, whenever it is in its non-actuated position, to substantially establish the starting connections of the aforesaid starting winding-means even when the start-run switching-means is in its running condition, means for initially energizing said relay from the output-terminals of the reversing-switch through the auxiliary relaying circuit of said start-run switching-means when the latter is in its starting condition, and separate circuit-means, responsive to the actuated position of said relay, for subsequently maintaining the energization of said relay from the output-terminals of the reversing-switch as long as at least a predetermined voltage is applied thereto, said relay returning to its non-actuated position whenever said reversing-switch is actuated from its first position to its third position, or vice versa, and said start-run switching-means being operative, in its running condition, to make it impossible for said auxiliary relaying circuit to supply said relay with said predetermined voltage.

5. The invention as defined in claim 1, characterized by said start-run means having an actuating means which is automatically responsive to a predetermined function of the speed of the motor.

6. The invention as defined in claim 2, characterized by said start-run means having an actuating means which is automatically responsive to a predetermined function of the speed of the motor.

7. The invention as defined in claim 3, characterized by said start-run means having an actuating means which is automatically responsive to a predetermined function of the speed of the motor.

8. The invention as defined in claim 4, characterized by said start-run means having an actuating means which is automatically responsive to a predetermined function of the speed of the motor.

WENDELL C. SPEAR.